United States Patent Office 3,509,213
Patented Apr. 28, 1970

3,509,213
COBALT SULFIDE AND RHENIUM SULFIDE AS CATALYSTS FOR REDUCTIVE ALKYLATION OF AROMATIC AMINO AND NITRO COMPOUNDS
Harold Greenfield, Watertown, and Frederick S. Dovell, Naugatuck, Conn., assignors to Uniroyal, Inc., a corporation of New Jersey
No Drawing. Continuation of application Ser. No. 285,901, June 6, 1963. This application Oct. 19, 1966, Ser. No. 587,693
Int. Cl. C07c 85/00; B01j 11/74
U.S. Cl. 260—563
7 Claims

ABSTRACT OF THE DISCLOSURE

This invention provides a process for the reductive alkylation of aromatic amines and their nitro precursors with aliphatic ketones or aldehydes using a catalyst which is cobalt sulfide and/or rhenium sulfide.

This is a continuation of copending application Ser. No. 285,901, filed June 6, 1963 and now abandoned.

This invention relates to catalysis, and more particularly concerns a process for catalyzing the reductive alkylation of amines.

Conventional catalysts used for reductive alkylations often promote undesirable side reactions, especially at high temperatures and pressures. Nickel catalysts used in the reductive alkylation of aryl amines cause nuclear hydrogenation of aromatic rings (U.S. Patent No. 2,323,-948, issued on July 13, 1943). The noble metal catalysts not only cause nuclear hydrogenation of aromatic rings, but also cleavage of carbon-nitrogen linkages (British patent No. 712,100, issued on July 21, 1954).

The poisoning of hydrogenation catalysts by even small amounts of sulfur, hydrogen sulfide, or other compounds containing sulfide linkages is discussed in many references including Journal of the American Chemical Society, Volume 70, page 1392 (1948); "Reactions of Hydrogen with Organic Compounds" by H. Adkins (University of Wisconsin Press, 1937), page 22; "Catalysis" by Berkman, Morrell, and Egloff (Reinhold Publishing Corp., 1940) pages 391–393. Sulfur poisoning of specific catalysts is discussed in Industrial and Engineering Chemistry, Volume 52, page 417 (1960) and Volume 33, page 1373 (1941).

It is an object of this invention to provide a process for catalyzing the reductive alkylation of amines and their nitro precursors (including mononitromonoamino compounds) with ketones or aldehydes.

It is a special object of this invention to provide a process which will catalyze the reductive alkylation of a primary aromatic amine with an aliphatic ketone to produce a corresponding secondary alkylaryl amine, but which will not, through side reactions, cause cleavage by hydrogenolysis of carbon-nitrogen linkages, nor reductive hydrogenation of aromatic rings or of ketones (to the corresponding alcohols).

It is a further object of this invention to provide a hydrogenation process using a catalyst having a long life and a high level of activity even after long exposure to the common catalyst poisons, in particular sulfur.

This invention comprises the use of cobalt and rhenium sulfides, as heterogeneous hydrogenation catalysts for the reductive alkylation of amines with molecular hydrogen and ketones or aldehydes.

The advantages of the catalysts of this invention over those previously used in the art are several. Firstly, they provide a degree of desired selectivity hitherto unattainable in certain hydrogenation reactions, such as reductive alkylations. For example, in a typical and industrially important reductive alkylation of a primary aromatic amine with an aliphatic ketone to produce the corresponding secondary alkylaryl amine, as in the alkylation of N-phenyl-p-phenylenediamine with acetone to produce N - isopropyl - N' - phenyl - p - phenylenediamine (also known as p-isopropylaminodiphenylamine, a p-alkylamino aromatic amine), there is no catalyst previously known in the art that does not result in at least one of the following important side reactions: hydrogenation of the aromatic ring, cleavage by hyrogenolysis of carbon-nitrogen linkages, and reduction of the ketone to the corresponding alcohol. The first two of these side reactions may be substantially eliminated by the use of selected reaction conditions and rhenium sulfide as the reductive alkylation catalyst. All three are eliminated by the use of cobalt sulfide.

Secondly, these metal sulfide catalysts are insensitive to poisons, even the sulfur-containing compounds that severely inhibit most other catalysts. Thus, catalysts of this invention may be used with sulfur-containing feeds and do not require the use of purified hydrogen. Indeed, these metal sulfide catalysts may be used for the hydrogenation of compounds containing one or more sulfur atoms in the molecule. Their insensitivity to poisons insures a long life at a high level of activity, even after long exposure to the common catalyst poisons.

Furthermore, with the catalysts of this invention the same final products are obtained whether the original reactant to be hydrogenated is a primary amine (e.g., N-phenyl - p - phenylenediamine) or a primary amine precursor, such as a nitro compound (e.g., p-nitrodiphenylamine, which is reduced to the corresponding intermediate primary amine in situ).

The techniques and disadvantages of conventional preparations of alkylaryl secondary amines by the reductive alkylation of a primary aromatic amine with aliphatic ketones in the presence of hydrogen are discussed in "Copper Chromite Catalysts for Reductive Alkylation," I & EC Product Research and Development, Volume 1, pages 179–181 (September 1962), and the references cited therein.

The cobalt and rhenium sulfide catalysts can be prepared by reaction of the appropriate compounds of the metals with solutions of alkali, alkaline earth or ammonium sulfides, hydrosulfides or polysulfides; by treatment of solutions of appropriate compounds of the metals in dilute acids with hydrogen sulfide; by reaction of the metal itself with hydrogen sulfide, elemental sulfur or other sulfur-containing compounds; and by other methods obvious to those skilled in the art of catalyst preparation. The catalyst may be prepared in situ or added to the hydrogenation reaction mixture after prior preparation and isolation. Further, the catalyst may be prepared and used as a bulk powder or supported on a suitable carrier, such as carbon or alumina; and, whether supported or not, may be prepared and used as a powder for liquid phase slurry and for vapor phase fluidized reactions, or as a pellet for liquid or vapor phase fixed bed operations.

The catalyzed hydrogenation reactions may be run at temperatures ranging from about 60° C. to 200° C. or other temperatures as high as the stability of the reactants will permit and at pressures ranging from about 150 to 2000 or even to many thousand p.s.i.g. The exact conditions will depend, of course, on the nature of the hydrogenation reaction being carried out, and the optimum economic combination of temperature, pressure, catalyst level and cycle time. The range of practical catalyst levels is illustrated by the examples given below. Quantitative or almost quantitative conversions, may be achieved in some cases with as low a weight ratio of catalyst (bulk or supported) to amine as 0.001.

The reactions may be carried out in either batch or continuous systems with either tank or pipe-line type reactors, and in the liquid phase with slurry or fixed bed catalysts or in the vapor phase with either fluidized or fixed bed catalysts, operating in a manner well known to those skilled in the art.

Conventional details (such as temperatures, reaction rates, reactants, etc.) for the various reactions mentioned above and in the examples below are cited in Chapter 3, "Preparation of Amines by Reductive Alkylation," (written by Emerson) of Volume 4 of the Organic Reactions series published by John Wiley & Sons, New York.

The following examples are presented to bring out with particularity the scope and utility of the invention. The term "topping" is commonly used in the art to describe the removal of a low boiling component (distillate) by distillation of a mixture (heating at a given temperature and pressure) to obtain a higher boiling residue. The stainless-steel Magne-Dash autoclave used in the examples is a commercially available reaction pot equipped with temperature and pressure controls.

Example 1

To a 600-ml. stainless-steel Magne-Dash autoclave was added 69.8 grams (0.75 mole) of aniline, 131 grams (2.25 moles) of acetone and 28.0 grams (3.75 grams on a dry basis) of an isopropanol paste of a cobalt sulfide catalyst prepared as described in the literature [M. S. Farlow, M. Hunt, C. M. Langkammerer, W. A. Lazier, W. J. Peppel and F. K. Signaigo, J. Am. Chem. Soc., 70, 1392 (1948)] and containing 13.5 wt. percent solids. The autoclave was sealed, purged first with nitrogen and then with hydrogen, and hydrogen added to a pressure of 1400 p.s.i.g. The reaction mixture was heated with agitation for 6.6 hrs. at about 180° C. and 1600–1800 p.s.i.g. The autoclave was cooled and depressurized, and its contents filtered to remove the catalyst. The filtrate was topped to a pot temperature of 180° C. at atmospheric pressure. The residue product weighed 88 grams and was shown by vapor phase chromatographic analysis to contain 53 grams (52% yield) of N-isopropylaniline and 26.5 grams (38% yield) of recovered aniline. There was only a trace of N-isopropylcyclohexylamine, showing the absence of any significant nuclear hydrogenation of the product.

Example 2

To the 600-ml. Magne-Dash autoclave was added 69.8 grams (0.75 mole) of aniline, 131 grams (2.25 moles) of acetone and 2.5 grams of rhenium sulfide, prepared as described in the literature [H. S. Broadbent, L. H. Slaugh and N. L. Jarvis, J. Am. Chem. Soc., 76, 1519 (1954)]. The autoclave was sealed, purged first with nitrogen and then with hydrogen, and hydrogen added to a pressure of 1300 p.s.i.g. The reaction mixture was heated with agitation for 4.4 hrs. at 140° C. and 1200–1400 p.s.i.g. The gas absorption was about 280% of theory for the desired reductive alkylation reaction. The autoclave was cooled and depressurized, and its contents filtered to remove the catalyst. The filtrate was topped to a pot temperature of 185° C. at atmospheric pressure. Vapor phase chromatographic analysis of the distillate showed that most of the excess acetone had been reduced to isopropanol, thereby accounting for the high gas absorption. The residue weighed 96 grams and was shown by vapor phase chromatographic analysis to contain 91 grams (90% yield) of N-isopropylaniline.

Example 3

To the 600-ml. stainless-steel Magne-Dash autoclave was added 24.6 grams (0.20 mole) of nitrobenzene, 150 grams (2.58 moles) of acetone and 18.5 grams (2.5 grams on a dry basis) of the isopropanol paste of the cobalt sulfide catalyst used in Example 1. The autoclave was sealed, purged first with nitrogen and then with hydrogen, and hydrogen added to a pressure of 1300 p.s.i.g. The reaction mixture was heated with agitation for 0.2 hr. at 140° C. and 1200–1340 p.s.i.g. The autoclave was cooled, depressurized, and the contents filtered to remove the catalyst. The filtrate was topped to a pot temperature of 185° C. at atmospheric pressure. The residue product was shown by vapor phase chromatographic analysis to contain 84 wt. percent N-isopropylaniline and 13 wt. percent recovered aniline.

Example 4

To the 600-ml. stainless-steel Magne-Dash autoclave was added 24.6 grams (0.20 mole) of nitrobenzene, 143 grams (2.45 moles) of acetone and 37.0 grams (5.0 grams on a dry basis) of the isopropanol paste of the cobalt sulfide catalyst used in Example 1. The autoclave was sealed, purged first with nitrogen and then with hydrogen, and hydrogen added to a pressure of 1300 p.s.i.g. The reaction mixture was heated with agitation for 3.3 hrs. at 80° C. and 1200–1400 p.s.i.g., with little or no gas absorption in the last 1.5 hrs. The autoclave was cooled, depressurized, and the contents filtered to remove the catalyst. The filtrate was topped to a pot temperature of 180° C. at atmospheric pressure. The residue product was shown by vapor phase chromatographic analysis to contain about 54 wt. percent N-isopropylaniline and 46 wt. percent aniline.

Example 5

To the 600-ml. stainless-steel Magne-Dash autoclave was added 24.6 grams (0.20 mole) of nitrobenzene, 57.6 grams (0.80 mole) of freshly distilled butyraldehyde, 115 ml. of isopropanol and 37.0 grams (5.0 grams on a dry basis) of the isopropanol paste of the cobalt sulfide catalyst used in Example 1. The autoclave was sealed, purged first with nitrogen and then with hydrogen, and hydrogen added to a pressure of 1300 p.s.i.g. The reaction mixture was heated with agitation for 2 hrs. at 90° C. and 1200–1400 p.s.i.g., for 2 hrs. at 90–180° C. and 1400–1600 p.s.i.g., and for 2 hrs. at 180° C. and 1400–1600 p.s.i.g. The autoclave was cooled, depressurized, and the contents filtered to remove the catalyst. After the solvent was removed by topping to a pot temperature of 180° C. at atmospheric pressure, there was obtained 32 grams of a residue product that was shown by vapor phase chromatographic analysis to contain about 8 grams (43% yield) aniline, 3 grams (10% yield) N-n-butylaniline, and 4 grams (10% yield) N,N-di-n-butylaniline.

Example 6

To the 600-ml. stainless-steel Magne-Dash autoclave was added 41.4 grams (0.30 mole) of p-nitroaniline, 130 grams (1.80 moles) of methyl ethyl ketone, and 85.0 grams (11.5 grams on a dry basis) of the isopropanol paste of the cobalt sulfide catalyst used in Example 1. The autoclave was sealed, purged first with nitrogen and then with hydrogen, and hydrogen added to a pressure of 1300 p.s.i.g. There was an exothermic reaction, presumably reduction of the nitro group, at 110–150° C. and 1200–1400 p.s.i.g. over a period of about 5–10 min. The reaction mixture was heated for 6 hrs. at 180° C. and 1200–1400 p.s.i.g. The autoclave was cooled, depressurized, and its contents filtered to remove the catalyst. The filtrate was topped to a pot temperature of 160° C. at 30 mm. The residue product weighed 68 grams and was shown by vapor phase chromatographic analysis to contain no p-phenylenediamine and 62 grams (94% yield) of N,N'-di-sec-butyl-p-phenylenediamine. This yield is considerably higher than that obtained with a conventional palladium catalyst.

As demonstrated by the above examples, rhenium sulfide is the more active catalyst. Any such order of activity, however, depends to some extent upon the method of preparation of the individual catalyst.

Rhenium sulfide caused hydrogenation of excess ketone (ketone not participating in the reductive alkylation) to the corresponding alcohol in Example 2. There was substantially no hydrogenation of the aromatic ring (an important side reaction with nickel and noble metal catalysts), substantially no cleavage of carbon-nitrogen bonds with alkyl amine formation (as caused by noble metal catalysts), and, except when rhenium sulfide was used, substantially no ketone reduction (a major disadvantage of copper chromite catalysts).

Sulfides of chromium, manganese, silver, copper, tin, vanadium, zinc and lead were prepared and tested as above, but showed little or no activity under normal conditions of reaction for the reductive alkylation of aryl amines (as determined by tests for significant hydrogen gas absorption and by gas-liquid chromatographic analysis).

It should be understood that the precise proportions of the materials utilized may be varied and equivalent chemical materials may be employed, if desired, without departing from the spirit and scope of the invention as defined by the below-appended claims. For example, acyclic and cyclic amines and ketones may be used in place of aromatic ones with equally efficacious results. Reactions of particular interest are the preparation of N-isopropyl-N'-phenyl-p-phenylenediamine from acetone and N-phenyl-p-phenylenediamine and the preparation of dicyclohexylamine from cyclohexylamine and cyclohexanone.

Furthermore, the conditions of reaction and reactant concentrations utilized in the foregoing examples may be varied to satisfy the particular requirements of a user of the process of the invention.

Having thus described our invention, what we claim and desire to protect by Letters Patent is:

1. A reductive alkylation process comprising reacting a compound selected from the group consisting of napthalene and benzene aromatic compounds containing at least one substituent selected from nitro, amino and lower alkyl wherein at least one of said substituents is nitro or amino and further consisting of cyclohexylamine with hydrogen and with a compound selected from the group consisting of compounds having the generic formula

wherein R and $R^1$ can be the same or different, and wherein R and $R^1$ can be hydrogen and lower alkyl and further consisting of cyclohexanone, to form the corresponding alkylated amine in the presence of a catalyst comprising a sulfide of cobalt or rhenium or mixtures thereof.

2. The process of claim 1 wherein the compound selected from the first named group is a primary amine.

3. The process of claim 2 wherein said primary amine is cyclohexylamine.

4. The process of forming dicyclohexylamine which comprises reacting cyclohexylamine with cyclohexanone and hydrogen in the presence of a catalytic amount of a sulfide of cobalt, rhenium or mixtures thereof at a temperature of above 60° C. and at a pressure of at least 150 p.s.i.g.

5. A process for forming N-isopropylaniline which comprises: reacting aniline or nitrobenzene with hydrogen and acetone in the presence of a catalytic amount of a sulfide of cobalt, rhenium or mixtures thereof at a temperature above 60° C. and a pressure at least 150 p.s.i.g.

6. A process for preparing N-isopropyl-N'-phenyl-p-phenylenediamine which comprises reacting N-phenyl-p-phenylenediamine with hydrogen and acetone in the presence of a catalytic amount of a sulfide of cobalt, rhenium or mixtures thereof at a temperature above 60° C. and at a pressure of at least 150 p.s.i.g.

7. A process for preparing N,N'-di-sec.-butyl-p-phenylenediamine which comprises reacting p-nitroaniline with hydrogen and methyl ethyl ketone in the presence of a catalytic amount of a sulfide of cobalt, rhenium or mixtures thereof at a temperature above 60° C. and at a pressure of at least 150 p.s.i.g.

References Cited

UNITED STATES PATENTS

| | | | |
|---|---|---|---|
| 2,969,394 | 1/1961 | Chenicek | 260—577 |
| 3,209,030 | 9/1965 | Bicek | 260—563 |
| 3,219,705 | 11/1965 | Harris | 260—576 |
| 3,350,450 | 10/1967 | Dovell et al. | 260—577 |

ROBERT V. HINES, Primary Examiner

U.S. Cl. X.R.

203—59; 252—439; 260—576, 577